United States Patent

Jenne et al.

[11] Patent Number: 6,099,616
[45] Date of Patent: Aug. 8, 2000

[54] METHOD FOR RECOVERING VAPORS DURING THE DISPENSING OF A BITUMINOUS PRODUCT

[75] Inventors: Richard A. Jenne, Gahanna, Ohio; Joseph M. Konieczka, Lemont, Ill.

[73] Assignee: Owens Corning Fiberglas Technology, Inc., Summit, Ill.

[21] Appl. No.: 09/143,950

[22] Filed: Aug. 31, 1998

[51] Int. Cl.[7] .............................. B01D 5/00; B01D 19/00
[52] U.S. Cl. ................... 95/1; 95/24; 95/257; 96/155; 96/157; 55/385.4; 55/338.1; 220/367.1
[58] Field of Search ................... 95/1, 24, 241, 95/254, 257, 266, 256, 288; 96/155, 193, 201, 157, 194, 195, 196; 55/385.4, 339, 340, 338.1; 220/367.1, 582, 913, DIG. 24; 62/606, 611, 614

[56] References Cited

U.S. PATENT DOCUMENTS

| | | | |
|---|---|---|---|
| 1,036,806 | 8/1912 | Desmaroux | 95/257 |
| 2,004,074 | 6/1935 | Kiley | 55/385.4 |
| 3,581,782 | 6/1971 | Onufer . | |
| 3,994,322 | 11/1976 | Overall . | |
| 4,360,428 | 11/1982 | Comparetto et al. | 96/195 |
| 4,515,189 | 5/1985 | Mowatt-Larssen . | |
| 4,886,525 | 12/1989 | Hoover | 95/266 |
| 5,199,471 | 4/1993 | Hartman et al. . | |
| 5,289,856 | 3/1994 | Strock et al. . | |
| 5,443,325 | 8/1995 | Simonelli et al. . | |
| 5,515,686 | 5/1996 | Jordan . | |
| 5,591,244 | 1/1997 | Vross et al. . | |
| 5,639,427 | 6/1997 | Chenevert et al. | 220/367.1 |
| 5,743,941 | 4/1998 | Gerner et al. | 96/10 |

OTHER PUBLICATIONS

Viking Pump, Internet article The Viking Flow Manager. Website address www.vikingpump.com/products/flowman.htm.

*Primary Examiner*—David A. Simmons
*Assistant Examiner*—Robert A. Hopkins
*Attorney, Agent, or Firm*—Inger H. Eckert; James J. Dottavio

[57] ABSTRACT

In a method for recovering vapors during the dispensing of a bituminous product into a tank, an inlet opening of the tank is closed with a fitting. The bituminous product is dispensed into the tank via the fitting. The bituminous product emits vapors inside the tank. The vapors are exhausted from the tank without direct contact of the vapors with moving parts. The vapors are transported to a condenser, and condensed to a liquid in the condenser. The condensed liquid is returned to the tank via the fitting.

20 Claims, 4 Drawing Sheets

6,099,616

METHOD FOR RECOVERING VAPORS DURING THE DISPENSING OF A BITUMINOUS PRODUCT

TECHNICAL FIELD AND INDUSTRIAL APPLICABILITY OF THE INVENTION

This invention relates to a method for recovering vapors during the dispensing of a bituminous product into a tank. The invention can be used, for example, to recover vapors of volatile diluent during the dispensing of a cutback asphalt into a tanker truck.

BACKGROUND OF THE INVENTION

A cutback asphalt is manufactured by blending asphalt with a volatile diluent such as naphtha or mineral spirits. The diluent reduces the viscosity of the asphalt so that the cutback asphalt can be transported and used at lower temperatures. After the cutback asphalt is applied, the diluent evaporates to increase the viscosity of the product. Cutback asphalts are used for paving and other applications.

After manufacture, the cutback asphalt is usually held in a storage tank, and then dispensed into a tanker truck at a loading station for transport to the customer. During the dispensing, vapors of the volatile diluent are emitted from the cutback asphalt. The vapors create an environmental problem if too many vapors escape into the atmosphere.

To address this problem, a system could be installed to return the vapors to the storage tank. This system has not proven to be effective for recovering vapors at a cutback asphalt loading station. The system also requires special equipment which increases the cost and complexity of the dispensing operation.

Vapor recovery methods disclosed in previous patents also do not adequately address this problem. For example, U.S. Pat. No. 5,591,244 discloses the recovery of asphalt vapors from a roofing asphalt supply truck as the asphalt is pumped from the truck to the roof. The vapors are recovered and filtered. There is no condensation involved, and no return of any substance to the asphalt material.

U.S. Pat. No. 4,515,189 discloses vapor recovery during the filling of rail tank cars with molten sulfur. There is no disclosure of asphalt vapors, and no disclosure of returning condensed vapors to the tank.

In view of the shortcomings of the previous vapor recovery methods, it would be desirable to provide a method for recovering vapors during the dispensing of a bituminous product such as cutback asphalt into a tank, where the method is relatively simple and inexpensive, and where the method is very efficient in recovering the vapors.

SUMMARY OF THE INVENTION

The above objects as well as other objects not specifically enumerated are achieved by a method for recovering vapors during the dispensing of a bituminous product into a tank. In the method, an inlet opening of the tank is closed with a fitting. The bituminous product is dispensed into the tank via the fitting. The bituminous product emits vapors inside the tank. The vapors are exhausted from the tank without direct contact of the vapors with moving parts. The vapors are transported to a condenser, and condensed to a liquid in the condenser. The condensed liquid is returned to the tank via the fitting.

Various objects and advantages of this invention will become apparent to those skilled in the art from the following detailed description of the preferred embodiment, when read in light of the accompanying drawings.

DETAILED DESCRIPTION AND PREFERRED EMBODIMENTS OF THE INVENTION

The present invention relates to a method for recovering vapors during the dispensing of a bituminous product into a tank. The bituminous product can be a bituminous material alone, or a blend of a bituminous material with one or more other materials. The bituminous materials include asphalts, tars, pitches, and other known bituminous materials. Typically, the bituminous material is an asphalt. The asphalt is usually a manufactured asphalt produced by refining petroleum, such as an asphalt cement, but the asphalt can also be a naturally occurring asphalt. In a particular embodiment, the bituminous product is a cutback asphalt, which is a blend of an asphalt with a volatile diluent such as naphtha and/or mineral spirits.

Figure 1:
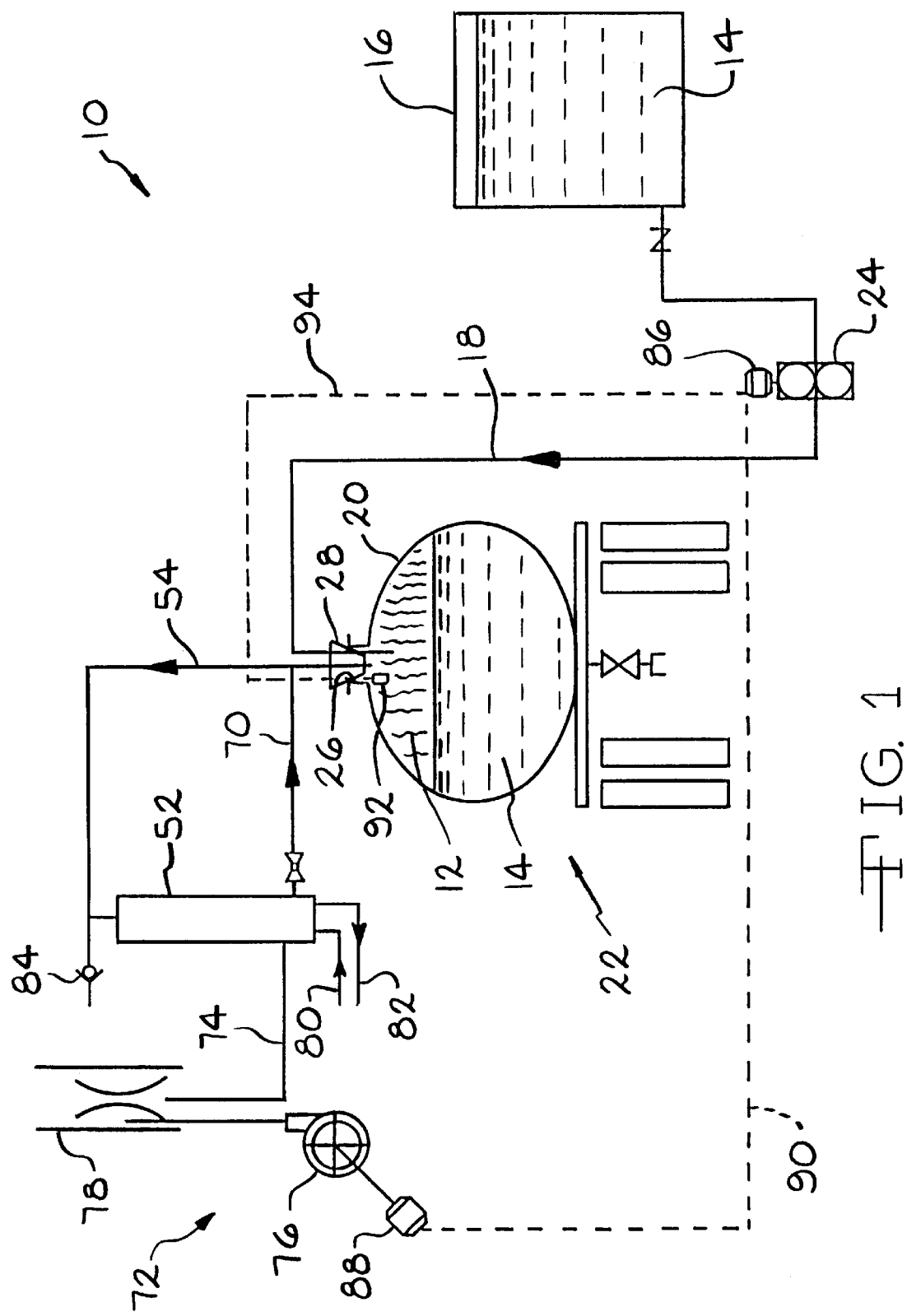
FIG. 1 is a schematic view of apparatus for recovering vapors during the dispensing of a cutback asphalt into the tank of a tanker truck, according to the method of the invention.

FIG. 1 illustrates apparatus 10 for recovering vapors 12 during the dispensing of cutback asphalt 14, according to the method of the invention. The cutback asphalt is dispensed from a storage tank 16 through an inlet conduit 18 into the tank 20 of a tanker truck 22. The cutback asphalt is usually dispensed from the storage tank at a temperature above about 110° F. (43.3° C.), and typically within a range of between about 120° F. (48.9° C.) and about 150° F. (65.6° C.). The cutback asphalt is dispensed by the action of a pump 24, which can be any type of pump suitable for causing the flow of the cutback asphalt. Preferably, the pump is a gear pump that can be set for a specific flow rate of the cutback asphalt into the tank.

Figure 2:
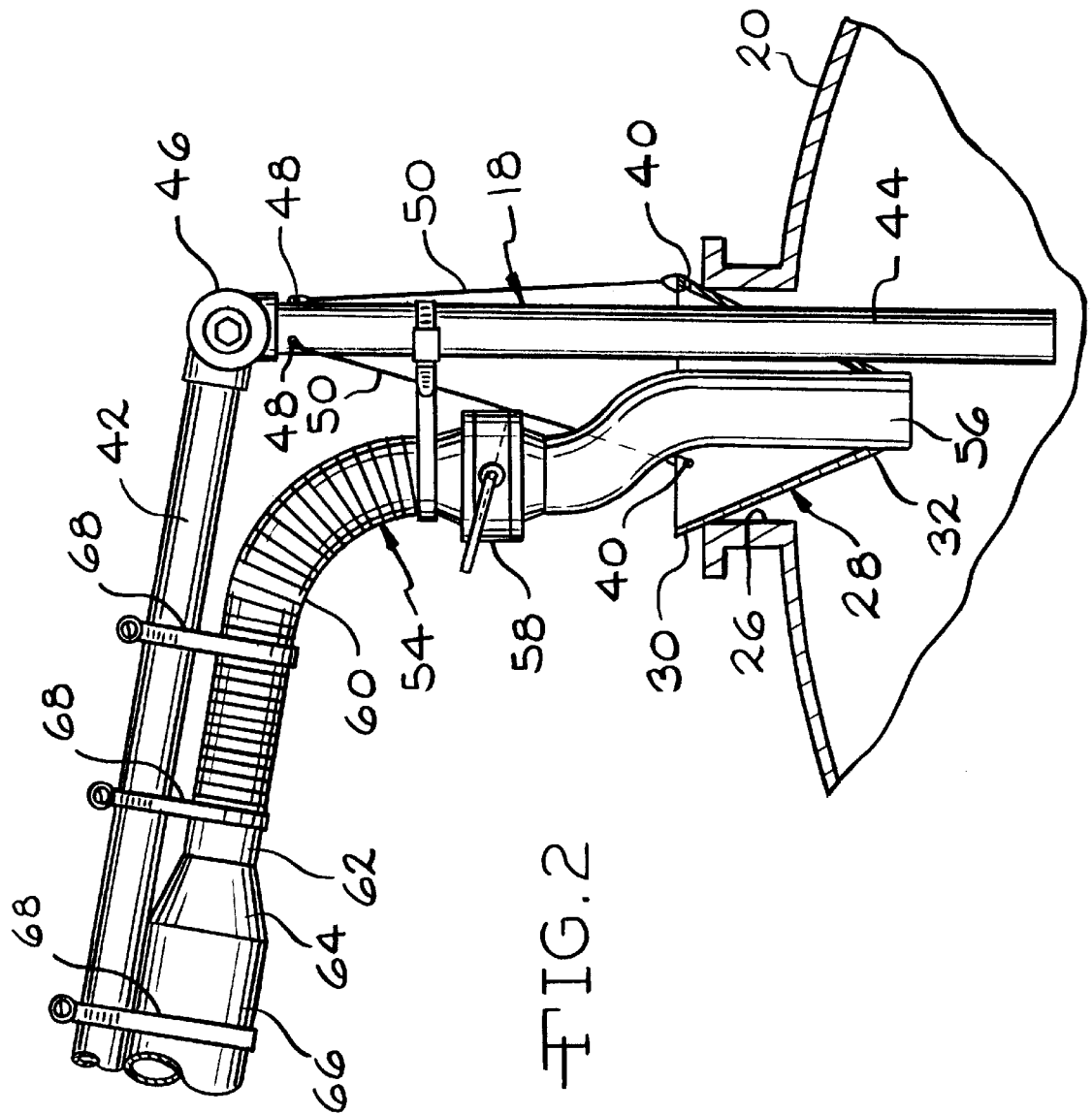
FIG. 2 is a front elevational view, partly in cross-section, of a portion of the apparatus of FIG. 1, illustrating a fitting closing an inlet opening of the tank, and an inlet conduit and an exhaust conduit extending through the fitting into the tank.
Figure 3:
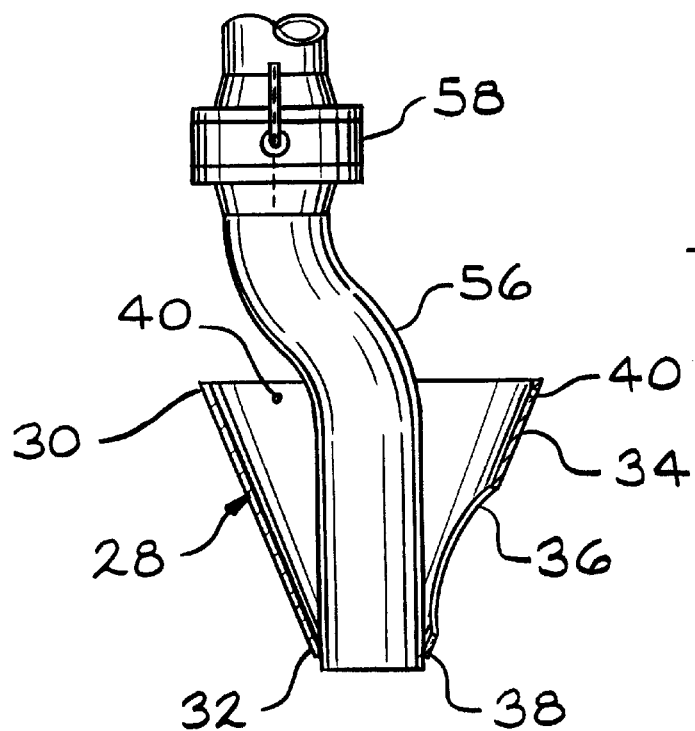
FIG. 3 is a front elevational view, partly in cross-section, illustrating the fitting and exhaust conduit of FIG. 2.
Figure 4:
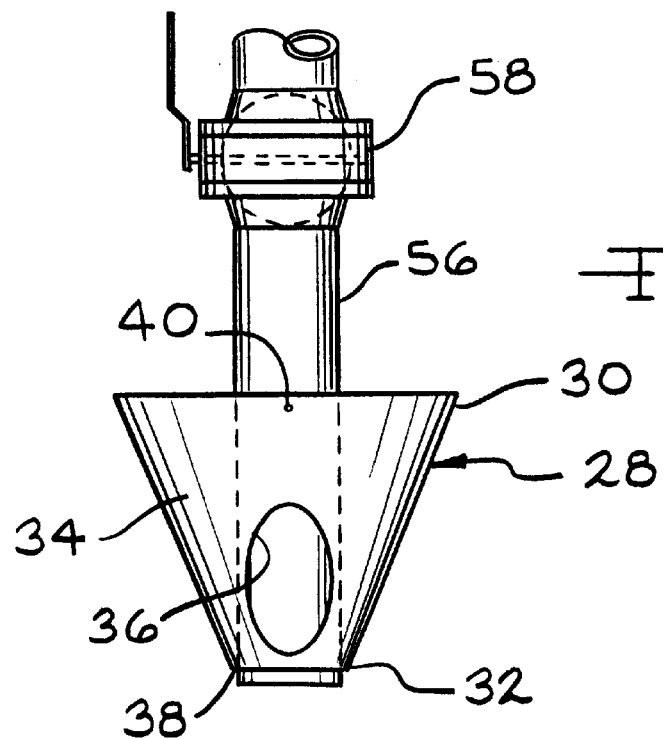
FIG. 4 is a side elevational view illustrating the fitting and exhaust conduit of FIG. 2.

As shown in FIGS. 1 and 2, the tank 20 includes an inlet opening 26 for dispensing the cutback asphalt. The illustrated inlet opening is circular in cross-section. In the present method, the inlet opening 26 of the tank is closed with a fitting 28. Preferably, the fitting substantially completely closes the inlet opening, for a purpose which will be described below. As shown in FIGS. 2–4, the illustrated fitting 28 is hollow and frustoconical in shape. The fitting tapers from a relatively wide outer end 30 to a relatively narrow inner end 32, so that the fitting closes the inlet opening of the tank like a cork closes an opening of a bottle. This structure allows the fitting to accommodate different sizes of inlet openings, such as may be found in different types of tanker trucks. In a preferred embodiment, the fitting has a diameter of about 22 inches (55.9 centimeters) at the outer end, a diameter of about 7 inches (17.8 centimeters) at the inner end, and a vertical length of about 18 inches (45.7 centimeters) from the outer end to the inner end. Such a fitting is particularly suited for closing an inlet opening having a diameter of about 21 inches (53.3 centimeters). The fitting includes a sidewall 34 having a side opening 36. The side opening is oval in shape, for a purpose which will be described below. In a preferred embodiment, the side opening has a length of about 10¼ inches (26.0 centimeters) and a width of about 5½ inches (14.0 centimeters). The fitting also includes an inner opening 38 at the inner end of the fitting. In a preferred embodiment, the inner opening has a diameter of about 6¾ inches (17.1 centimeters). The fitting further includes three attachment holes 40 (two of which are shown). Preferably, the fitting is made from a metallic material such as steel, or from another rigid material.

As shown in FIGS. 1 and 2, the cutback asphalt 14 is dispensed into the tank 20 via the fitting 28. In the illustrated embodiment, the cutback asphalt is dispensed into the tank through the inlet conduit 18 which extends through the fitting. The inlet conduit 18 extends through the side opening 36 of the fitting, and into the tank for dispensing the cutback asphalt. The illustrated inlet conduit includes a pair of pipes 42 and 44 which are pivotably connected at a swivel joint 46 for flexibility in positioning the inlet conduit. In a preferred embodiment, the pipes are metal pipes having a diameter of about 5 inches (12.7 centimeters). The oval shape and the size of the side opening allows the pipe 44 to extend straight down through the side opening with a tight fit. In a preferred embodiment, the pipe extends about 14 inches (35.6 centimeters) past the inner end of the fitting. Three rings 48 (two of which are shown) are attached to the pipe 44 below the swivel joint. The fitting 28 is attached to the pipe 44 by three cables 50 (two of which are shown) which extend between the rings 48 and the attachment holes 40 in the fitting.

The dispensed cutback asphalt 14 emits vapors 12 of volatile diluent inside the tank 20. The vapors are exhausted from the tank to allow adequate filling of the tank. In the present method, the vapors are exhausted from the tank and transported to a condenser 52. The vapors can be exhausted via the fitting 28, or they can be exhausted by other means, such as through a different opening, with or without a fitting. Preferably, the vapors are exhausted and transported via an exhaust conduit 54 which extends through the same fitting 28 as the inlet conduit 18. The illustrated exhaust conduit includes a metal tube 56 secured inside the fitting and extending through the inner opening 38 a short distance past the inner end 32 of the fitting. In a preferred embodiment, the pipe is about 6½ inches (16.5 centimeters) in diameter so that it fits tightly inside the inner opening, and it extends about ¼ inch (0.6 centimeter) past the inner end of the fitting. A damper 58, which may be opened and closed, is connected to the top of the tube 56. A flexible hose 60 is connected to the top of the damper. In a preferred embodiment, the flexible hose is metallic and has an inner diameter of about 7 inches (17.8 centimeters). The flexible hose is connected via a short pipe 62 and a reducer 64 to a pipe 66, which is preferably a metal pipe having a diameter of about 8 inches (20.3 centimeters). The exhaust conduit 54 is preferably attached to the pipe 42 of the inlet conduit 18 by three clamps 68.

Preferably, the vapors 12 are exhausted from the tank 20 and transported to the condenser 52 by pulling the vapors from the tank to the condenser through the exhaust conduit 54. The vapors can be pulled by creating a suction or vacuum in the condenser. Alternatively, the vapors could be exhausted from the tank under positive pressure. In the illustrated embodiment, the vapors are pulled from the tank to the condenser by an eductor fan 72 connected to the condenser via an outlet conduit 74. Any fan suitable for withdrawing the vapors from the tank can be used. The eductor fan includes a fan 76 which forces a flow of air through an eductor 78. The air flow through the eductor creates a suction in the outlet conduit and the condenser, thereby pulling the vapors into the condenser. By use of the eductor fan, the vapors are pulled from the tank to the condenser without direct contact with moving parts such as a fan. This makes the procedure much safer by eliminating any risk of explosion of the vapors. In a less preferred embodiment, a spark-proof fan (not shown) can be used to pull the vapors from the tank to the condenser.

The vapors are condensed to a liquid in the condenser 52. A preferred type of condenser is a shell-and-tube heat exchanger. Any condensing apparatus suitable for condensing the vapors to a liquid can be used. In the shell-and-tube heat exchanger, a cooling medium such as cold water is passed through a group of tubes which are surrounded by a shell. FIG. 1 shows a cooling water inlet 80 and a cooling water outlet 82 for the tubes inside the condenser. The vapors pass through the shell around the tubes. Heat is transferred from the warmer vapors to the cooler tubes, which causes the vapors to condense into a liquid. Other types of condensers could also be used in the invention. Preferably, the condenser is designed to condense VM&P naphtha and mineral spirits.

The condensed liquid is returned from the condenser 52 to the tank 20 via the fitting 28. In the illustrated embodiment, the condensed liquid is returned through a return conduit 70 which is connected to the exhaust conduit 54. Alternatively, the return conduit could be connected to the inlet conduit 18, or the return conduit could extend through the fitting.

As described above, the inlet opening of the tank is closed with the fitting. This limits the amount of air that can enter the inlet opening from outside the tank when the vapors are exhausted from the tank. If the inlet opening was not closed with the fitting, air would enter the tank and cause the vapors to expand in volume. For example, if the cutback asphalt is dispensed into the tank at a flow rate of 50 cubic feet per minute (cfm) (1,416 liters per minute), the volume of vapors may increase tenfold so that the vapors are exhausted from the tank at a flow rate of 500 cfm (14,160 liters per minute). In this example, the vapors are diluted by the air to 10% of their previous concentration. When the vapors are diluted to such an extent, the recovery of the vapors in the condenser is very inefficient, e.g., about 50% by weight or less. Such a low condensing efficiency will not adequately reduce the amount of vapors emitted to the atmosphere.

In contrast, by limiting the amount of air that can enter the inlet opening, the present method keeps the vapors concentrated. For example, if the cutback asphalt is dispensed at a flow rate of 50 cfm (1,416 liters per minute), the vapors may be exhausted from the tank at a flow rate of about 63 cfm (1,784 liters per minute). Preferably, when the cutback asphalt is dispensed into the tank at a first flow rate, the vapors are exhausted from the tank and transported to the condenser at a second flow rate which is not more than about 35% greater than the first flow rate on a volume basis. More preferably, the second flow rate is not more than about 20% greater than the first flow rate. It is also preferred that the vapors are exhausted from the tank and transported to the condenser at a flow rate which is not greater than about 75 cfm (2,124 liters per minute), and more preferably not greater than about 65 cfm (1,841 liters per minute). The flow rate of the cutback asphalt into the tank can be measured by a positive displacement flow meter, or can be determined by using a positive displacement pump or a flow control system such as described below. The flow rate of the asphalt vapors from the tank can be measured by use of a pitot tube or any other device that measures vapor flow.

The concentrated vapors allow the condenser to condense the vapors with high efficiency. Preferably, at least about 70% by weight of the exhausted vapors are condensed to a liquid in the condenser and returned to the tank, more preferably at least about 80%, and optimally at least about 87%.

The closing of the inlet opening of the tank with the fitting causes a partial vacuum inside the tank. A vacuum breaker or a check valve 84 (shown in FIG. 1) can be installed to ensure that excessive vacuum will not cause the tank to collapse.

Preferably, the present method employs flow control features which help to ensure simple and efficient dispensing and vapor recovery. One feature is that the steps of dispensing the cutback asphalt and exhausting the vapors are automatically controlled together so that the dispensing step is conducted only when the exhausting step is conducted. Specifically, a first interlock 86 is installed on the pump 24 and a second interlock 88 is installed on the eductor fan 72. The first and second interlocks are interconnected (as indicated by the dotted line 90) so that in order for the pump to operate, the fan must be operating. Another feature is that the pump is equipped with a volumetric metering device (not shown) with an adjustable set point so that the pump can be set for a specific flow rate of the cutback asphalt into the tank. Another feature is that the dispensing of the cutback asphalt is automatically monitored and controlled so that the dispensing is stopped when the tank is filled to a predetermined level. These flow control features can be incorporated into the method of the invention by use of a Viking Flow Manager, manufactured by Viking Pump, Inc., Cedar Falls, Iowa. As a backup, a level probe 92 (shown in FIG. 1) is attached to the fitting 28 and functions as a high level interlock. The level probe is connected to the first interlock on the pump (as indicated by the dotted line 94). When the cutback asphalt is filled to a predetermined level in the tank, the level probe shuts down the pump to prevent overfilling of the tank.

These flow control features allow the fitting to be designed with no view port, so that the amount of air entering the inlet port is limited and the volume of vapors that need to pass through the condenser is limited. This keeps the efficiency of the condensation process high.

It is to be understood that various different shapes of the inlet opening 26, fitting 28, side opening 36, and inlet conduit 18 can be used. However, a key aspect of the invention is a relatively tight fit for these structural parts to limit the undesirable inflow of air into the tank. To that end, any of these could be constituted of a resilient material to improve the tightness of the fit. Preferably, the tightness is sufficient to limit the flow of air into the tank to an amount less than about 10% of the flow of asphalt into the tank, more preferably less than about 5%, as measured on a volume basis. In such a case, the fitting is considered to substantially completely close the inlet opening of the tank.

Figure 5:
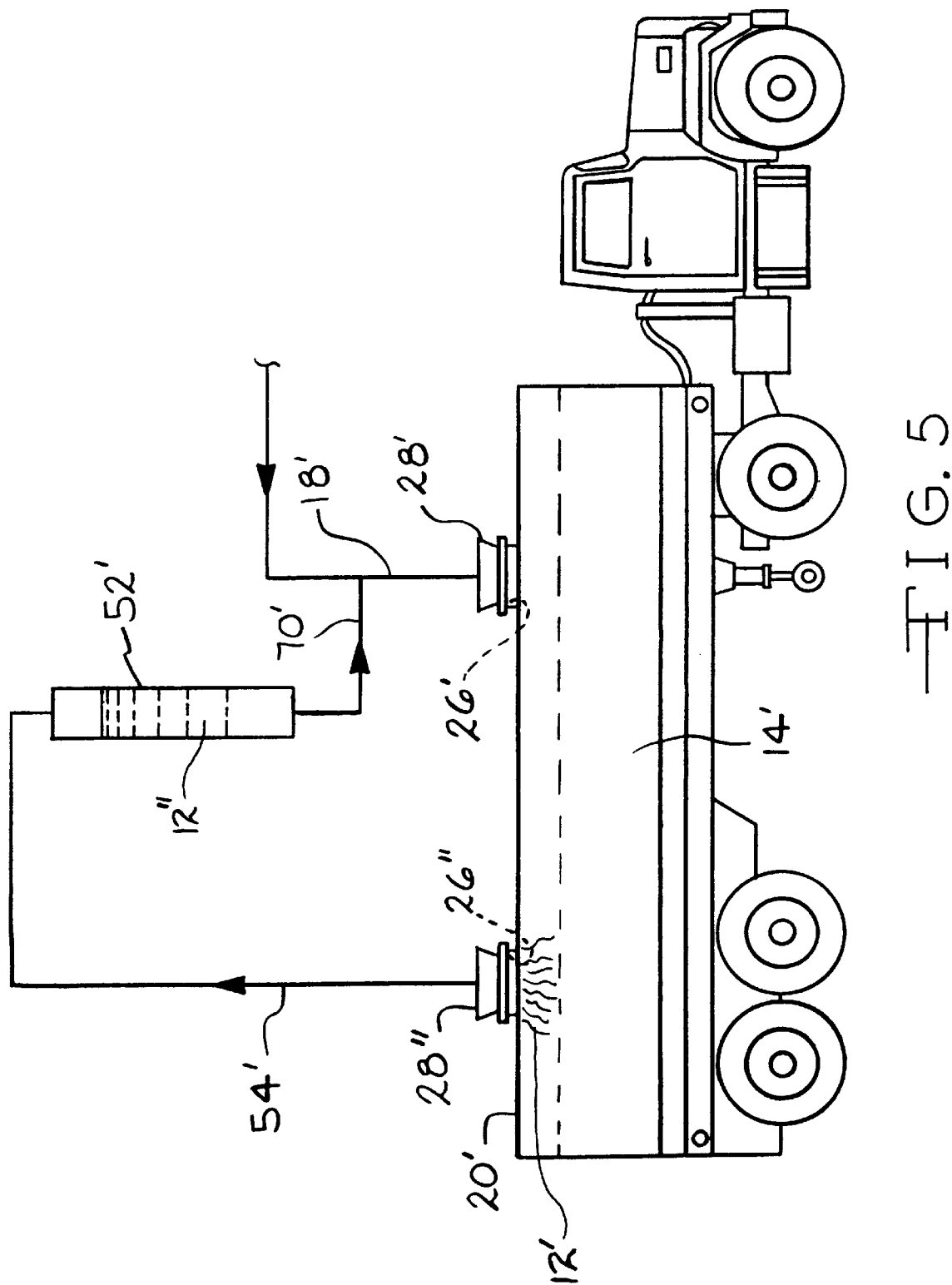
FIG. 5 is a side elevational view of a tanker truck, an inlet conduit and an exhaust conduit showing an alternate method of exhausting the vapors from the tank according to the method of the invention.

FIG. 5 illustrates an alternate embodiment in which the cutback asphalt 14' is dispensed into the tank 20' via an inlet conduit 18' which extends through a first fitting 28' in a first inlet opening 26', and the vapors 12' are exhausted from the tank via an exhaust conduit 54' which extends through a second fitting 28" in a second inlet opening 26". The vapors are condensed to a liquid 12" in a condenser 52', and returned to the tank via a return conduit 70' which connects to the inlet conduit.

In the illustrated embodiments, the vapors are exhausted from the tank and transported to the condenser in a single step. However, the vapors could also be transported to the condenser in a separate step, and by means other than the exhaust means.

The principle and mode of operation of this invention have been described in its preferred embodiments. However, it should be noted that this invention may be practiced otherwise than as specifically illustrated and described without departing from its scope.

What is claimed is:

1. A method for recovering vapors during the dispensing of a bituminous product into a tank, comprising the steps of:
   closing an inlet opening of the tank with a fitting,
   dispensing the bituminous product into the tank via the fitting, the bituminous product emitting vapors inside the tank,
   exhausting the vapors from the tank,
   transporting the vapors to a condenser,
   condensing the vapors to a liquid in the condenser, and
   returning the condensed liquid to the tank via the fitting.

2. The method of claim 1 in which the vapors are exhausted from the tank without direct contact of the vapors with moving parts.

3. The method of claim 1 in which the dispensing of the bituminous product comprises dispensing a blend of an asphalt and a volatile diluent, the blend emitting vapors of diluent inside the tank.

4. The method of claim 1 in which the dispensing of the bituminous product into the tank comprises dispensing the bituminous product into a tank of a tanker truck.

5. The method of claim 1 in which the exhausting of the vapors from the tank comprises pulling the vapors from the tank.

6. The method of claim 5 in which the transporting of the vapors to the condenser comprises pulling the vapors to the condenser.

7. The method of claim 1 in which the fitting substantially completely closes the inlet opening of the tank.

8. The method of claim 1 in which the inlet opening of the tank is closed with a fitting which tapers from a relatively wide outer end to a relatively narrow inner end.

9. The method of claim 1 in which the bituminous product is dispensed into the tank at a first flow rate, and the vapors are exhausted from the tank and transported to the condenser at a second flow rate which is not more than about 35% greater than the first flow rate.

10. The method of claim 1 in which the vapors are exhausted from the tank and transported to the condenser at a flow rate which is not greater than about 75 cubic feet per minute (2,124 liters per minute).

11. The method of claim 1 in which at least about 70% by weight of the exhausted vapors are condensed to a liquid in the condenser and returned to the tank.

12. A method for recovering vapors during the dispensing of a blend of an asphalt and a volatile diluent into a tank, comprising the steps of:
   closing an inlet opening of the tank with a fitting,
   dispensing the blend into the tank via the fitting at a first flow rate, the blend emitting vapors of diluent inside the tank,
   pulling the vapors from the tank to a condenser without direct contact of the vapors with moving parts, the vapors being pulled from the tank to the condenser at a second flow rate which is not more than about 35% greater than the first flow rate, condensing the vapors to a liquid in the condenser, and returning the condensed liquid to the tank via the fitting.

13. The method of claim 12 in which the vapors are pulled by an air flow generated by an eductor fan.

14. The method of claim 12 in which the dispensing is automatically monitored and controlled so that the dispensing is stopped when the tank is filled to a predetermined level with the blend.

15. The method of claim 12 in which the dispensing and pulling steps are automatically controlled together so that the dispensing step is conducted only when the pulling step is conducted.

16. The method of claim 12 in which the fitting substantially completely closes the inlet opening of the tank.

17. The method of claim 12 in which the inlet opening of the tank is closed with a fitting which tapers from a relatively wide outer end to a relatively narrow inner end.

18. The method of claim 12 in which the vapors are pulled from the tank via the fitting.

19. The method of claim 12 in which the blend is dispensed into the tank through an inlet conduit in the fitting, the vapors are pulled from the tank through an exhaust conduit in the fitting, and the condensed liquid is returned to the tank through a return conduit connected to one of the inlet conduit and the exhaust conduit.

20. A method for recovering vapors during the dispensing of a blend of an asphalt and a volatile diluent into a tank of a tanker truck, comprising the steps of:

substantially completely closing an inlet opening of the tank with a fitting which tapers from a relatively wide outer end to a relatively narrow inner end, dispensing the blend into the tank via the fitting at a first flow rate, the blend emitting vapors of diluent inside the tank, pulling the vapors from the tank to a condenser without direct contact of the vapors with moving parts, the vapors being pulled from the tank to the condenser at a second flow rate which is not more than about 20% greater than the first flow rate, condensing at least about 80% by weight of the pulled vapors to a liquid in the condenser, and returning the condensed liquid to the tank via the fitting.

* * * * *